United States Patent [19]

Hand et al.

[11] Patent Number: 4,905,629
[45] Date of Patent: Mar. 6, 1990

[54] METHOD AND APPARATUS FOR PREVENTING CRAWLING INSECTS OR OTHER CRAWLING PESTS FROM ENTERING THE FOOD AREA OF AN ANIMAL FEEDING BOWL

[76] Inventors: Herbert H. Hand, 233 Tram Rd., Columbia, S.C. 29210; Herbert G. Hand, 601 Mack St., Gaston, S.C. 29053

[21] Appl. No.: 271,040

[22] Filed: Nov. 15, 1988

Related U.S. Application Data

[63] Continuation-in-part of Ser. No. 133,171, Dec. 11, 1987, Pat. No. 4,784,086, which is a continuation-in-part of Ser. No. 914,335, Oct. 2, 1986, abandoned.

[51] Int. Cl.⁴ .............................................. A01K 5/01
[52] U.S. Cl. ..................................................... 119/61
[58] Field of Search ................ 119/61; D30/129, 130

[56] References Cited

U.S. PATENT DOCUMENTS

| | | | |
|---|---|---|---|
| 1,221,999 | 4/1917 | Kreiter . | |
| 2,191,811 | 2/1940 | Trampier, Sr. . | |
| 2,258,317 | 10/1941 | Clipper . | |
| 2,315,989 | 4/1943 | Tennison et al. . | |
| 2,554,086 | 5/1951 | Block | 119/61 |
| 2,584,301 | 2/1952 | Sinclair | 119/61 |
| 2,677,350 | 5/1954 | Prestidge et al. | 119/61 |
| 2,796,042 | 6/1957 | Cope | 119/61 |
| 2,813,509 | 11/1957 | Bruno | 119/61 |
| 3,147,739 | 9/1964 | Shaheen | 119/61 |
| 3,195,510 | 7/1965 | Bernstein | 119/61 |
| 3,441,003 | 4/1969 | DuMond et al. | 119/61 |
| 3,664,304 | 5/1972 | Carter | 119/61 |
| 3,722,476 | 3/1973 | Van Ness et al. | 119/61 |
| 3,995,595 | 12/1976 | Williams | 119/61 |
| 4,128,080 | 12/1978 | Haney | 119/61 |
| 4,328,636 | 5/1982 | Johnson | 43/107 |
| 4,357,905 | 11/1982 | Carpenter | 119/61 |
| 4,399,772 | 8/1983 | Salinas | 119/61 |
| 4,428,325 | 1/1984 | Koch | 119/61 |
| 4,691,664 | 9/1987 | Crowell | 119/61 |
| 4,784,086 | 11/1988 | Hand et al. | 119/61 |
| 4,800,845 | 1/1989 | Budd | 119/61 |

Primary Examiner—Paul J. Hirsch
Attorney, Agent, or Firm—McAndrews, Held & Malloy, Ltd.

[57] ABSTRACT

An animal feeding bowl for placement on the ground in which ants or other crawling insects or pests are prevented from entering the food area of the bowl. A combination of -tactic and ultraviolet light barriers are positioned with respect to the path of travel of the insect from ground to the food area.

13 Claims, 3 Drawing Sheets

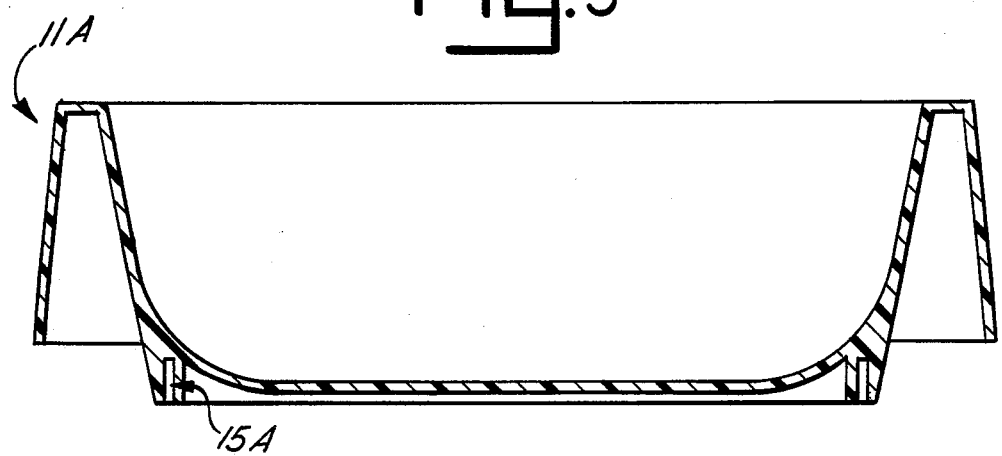
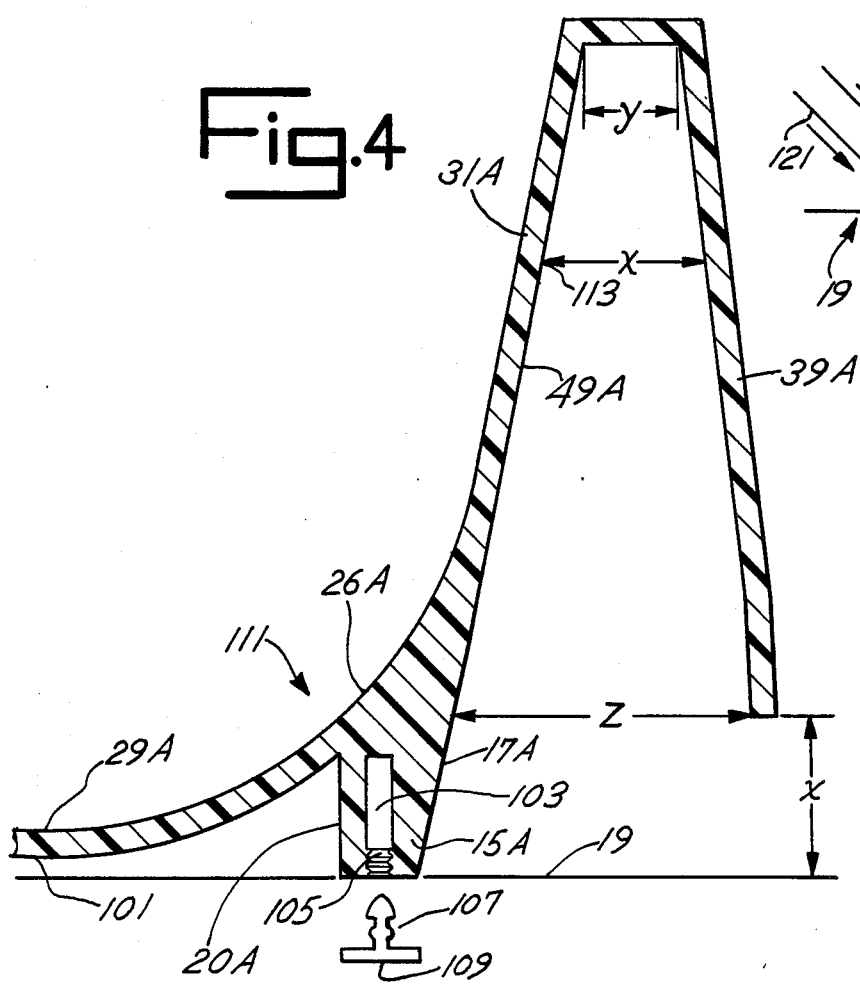
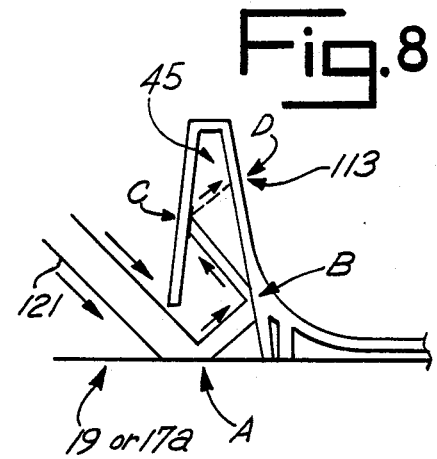

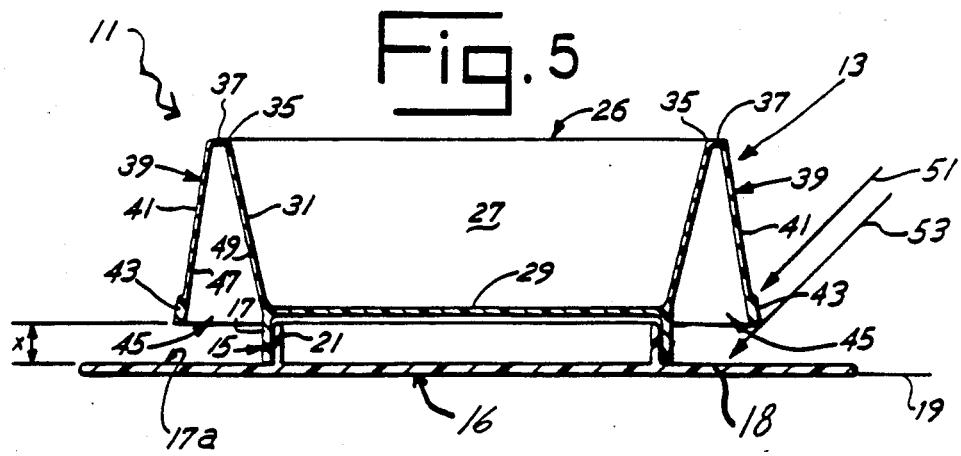
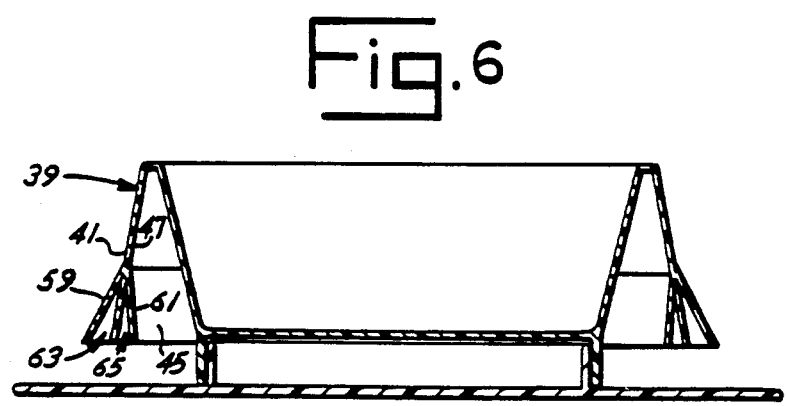
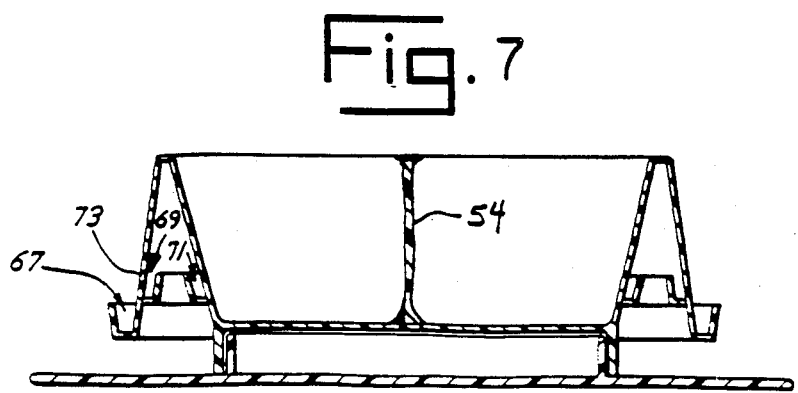

METHOD AND APPARATUS FOR PREVENTING CRAWLING INSECTS OR OTHER CRAWLING PESTS FROM ENTERING THE FOOD AREA OF AN ANIMAL FEEDING BOWL

RELATED PATENT APPLICATION

This application is a continuation-in-part of application Ser. No. 07/133, 171 filed Dec. 11, 1987, now U.S. Pat. No. 4,784,086, which is a continuation-in-part of application Ser. No. 914,335 filed Oct. 2, 1986 abandoned. Both of these prior applications are incorporated herein by reference.

BACKGROUND OF THE INVENTION

The relates to an animal feeding device and more particularly to a method and apparatus for preventing ants or other crawling insects or pests from entering the food or water area of an animal feeding bowl.

Heretofore, animal feeding dishes for holding food, water, or the like, utilize a moat obstacle across the pathway leading to the food area to prevent crawling insects from reaching the food or water.

With such devices, the user must constantly maintain the liquid level in the moat. If a liquid insecticide is used in the moat, the person handling the feeding device must be careful to keep from exposing the fingers to direct contact with the insecticide. Also, if insecticide is used, the moat must be positioned in an area where the animal using the device cannot lick or drink the insecticide.

Therefore, it is an object of the present invention to provide a feeding bowl assembly having physical barriers arranged in a particular manner for preventing crawling insects from reaching the food or water within the bowl portion of the device.

It is a further object of the present invention to provide a feeding bowl assembly having an aesthetically pleasing appearance while having physical barriers for preventing crawling insects from reaching the food and/or water within the bowl portion of the device.

It is yet another object of the present invention to provide a feeding bowl assembly having physical barriers which permit the use also of moat obstacles.

It is a further object of the invention to provide a non-skid surface to the bottom of a feeding bowl for preventing an animal from moving the bowl to an area which facilitates entry of insects or pests into the bowl.

SUMMARY OF THE INVENTION

These and other objects of the invention are achieved in a bowl assembly which disposes the food area above the ground or floor. A supporting structure provides a pathway leading from the ground toward the rim of the bowl. A physical obstacle wall extends downwardly from the rim and cooperates with the outer side wall of the bowl to provide multiple -tactic and ultraviolet light barriers.

BRIEF DESCRIPTION OF THE DRAWINGS

FIG. 3 is a cross-sectional side-view of a second preferred embodiment of an animal feeding dish of the present invention.

FIG. 4 is an enlarged view of a portion of the feeding dish of FIG. 3.

FIG. 5 is a cross-sectional side-view of the feeding dish of FIG. 2 and including a stand member.

FIG. 6 is a cross-sectional side-view of another embodiment of an animal feeding dish.

FIG. 7 is a cross-sectional side-view of another embodiment of an animal feeding dish.

FIG. 8 is a side view of the feeding dish of FIG. 3 with a diagrammatic representation of an ultraviolet ray 121.

DETAILED DESCRIPTION OF THE PREFERRED EMBODIMENT

Figure 1:
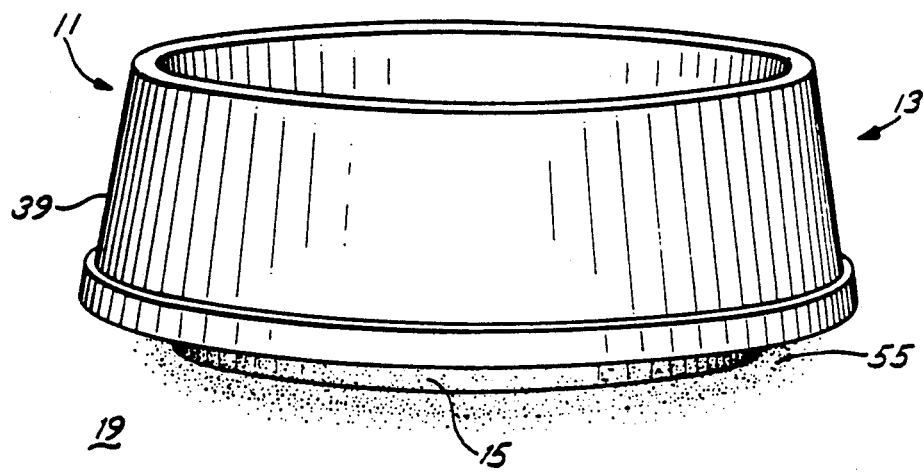
FIG. 1 is a perspective view of the preferred embodiment of an animal feeding dish of the present invention.
Figure 2:
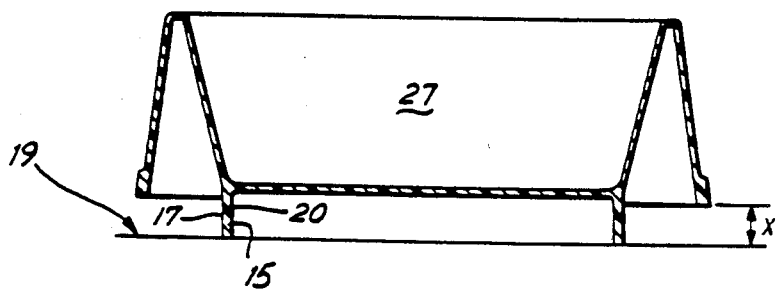
FIG. 2 is a cross-sectional side-view of the animal feeding dish of FIG. 1.

Referring to FIG. 1, an animal feeding dish or device 11 includes a generally circular shaped bowl assembly 13 disposed above the ground or floor surface by a base support member 15. As shown in FIG. 2, base support member 15 is generally cylindrical in shape and supports the bowl area 27 above the ground or floor. An outer surface 17 of the support member provides a sole pathway for a crawling insect to reach the bowl assembly from the ground.

Referring to FIG. 3, another animal feeding dish 11A is shown having an annular support member 15A. As shown in FIG. 4, support member 15A includes an inside surface 20A which is cylindrical in shape having a circular trace on the floor or ground. Inside surface 20A extends upwardly meeting with a bottom surface 101 of bowl 26A. An outside surface 17A of the support member is frustumconical in shape. The dish IIA is molded from a plastic material and support member 15A is molded integral with bowl 26A.

As shown in FIG. 4, support member 15A includes an annular slot 103 having a circular ring trace on ground 19. Horizontal ribbing 105 is formed at the bottom end of slot 103 for frictionally holding a circular insert ring 107. Ring 107 is extruded from a flexible plastic and is force fit into slot 103. Ring 107 is uniform having a cross-sectional area as that shown in FIG. 4. The width of ring 107 is sized relative to the width of slot 103 for providing a frictional force between the ring and the ribbing after the ring is forced into slot 103. This frictional force retains ring 107 within slot 103.

Ring 107 includes a bottom surface 109 which preferably contacts floor 19 along its continuous length which traces a circle or annular ring on floor 19. The insertion of ring 107 is preferably to a depth to permit bottom surface 109 to provide substantially continuous contact along its circular trace with floor 19 when the dish is placed on the floor. Ring 107 is made from a plastic material to provide non-skid frictional characteristics to surface 109. As will suggest itself, surface 109 may be shaped or embossed to provide non-skid characteristics to surface 109.

Ring 107 serves as a substantially continuous non-skid surface for dish 11A. Ring 107 makes it more difficult for an animal to push the dish against a wall or other object which would provide a pathway for a crawling pest to use in reaching the food or water in the dish.

As will suggest itself, ring 107 (as well as the floor trace of support member 15A) may take on shapes other than circular. For example, elliptical shapes, polygonal shapes and shapes formed of conjoint arcs may be used. It is preferred that the shape of the trace of surface 109 on floor 19 be substantially continuous to provide a maximum non-skid character to the dish. Of course, support member 15A, which as shown in FIGS. 3 and 4 is generally cylindrical, may be of different shapes and shortened or even removed such that surface 101 becomes the support member for the dish.

Referring to FIG. 5, an animal feeding dish 11 with its support member 15 may be attached to a stand member 16. Stand member 16 includes a flat circular member 18 having an outside diameter which is larger than the outer diameter of bowl assembly 13. As will suggest itself, stand member 16 may be used with the dish 11A of FIG. 3.

The top surface 17a of circular member 18 provides a pathway area 17a which leads to a second pathway area 17 formed of the outer surface 17 of the support member 15. The two pathway areas 17, 17a connected in tandem to provide the sole pathway for a crawling insect to reach bowl area 27.

Stand member 16 includes a circular lip or ring 21 which is centrally located on pathway area 17a. As will suggest itself, four separate arcuate lips may be used instead of a circular ring 21. Ring 21 includes an outer surface for frictionally engaging the inside surface 20 (FIG. 2) of support member 15 for attaching the stand to the feeding device 11.

As shown in FIG. 5, bowl assembly 13 includes a bowl 26 defining bowl area 27 for containing animal water or food. Bowl 26 is formed of a circular bottom 29 and a frustumconically shaped side wall 31. Bottom 29 has a diameter substantially the same as support member 15 and is formed integrally therewith. Side wall 31 flares upwardly and outwardly from bottom 29 as shown.

As shown in FIG. 4, bowl 26A has a larger radius of curvature in the area 111 (where the bottom surface 29A and side wall surface 31A meet) than is the radius of curvature of bowl 26 of FIG. 5 (where the bottom 29 and side wall 31 meet). Also, bowl 26A has its bottom surface 101 (FIG. 4) closer to the ground as compared to the bottom surface of bowl bottom 29 (FIG. 5). This lowers the center of gravity of the dish, making it more difficult for an animal to tip it over, lessening the contact of non-skid surface 109 with ground 19.

As will suggest itself, the single bowl 26 may be formed into two bowls (often called a "double diner") by a divider wall or walls. Further, bottom 29 may take on any shape, as for example, a circle, an ellipse, a polygon, an asymmetrical shape, a symmetrical shape, or any combination thereof. The side wall 31 and any divider walls, such as 54 (FIG. 7), may be frustumconical or cylindrical, extending upwardly from the shaped bottom member 29 so that one or more bowl areas are formed.

Support member 15 attaches over ring 21 in order to secure the stand member relative to the bowl assembly. The support member 15 and ring 21 provide a frictional area for attaching the stand member to the support member. Jostling, bumping, or the like, of the bowl assembly by the animal during feeding, should not dislodge the bowl assembly from the stand member.

Bowl 26 includes an upper circular ridge 35 forming the circumference of the bowl and defining the sole entry location of crawling insects from the outside to the inside of bowl 26. An upper bowl lip 37 extends horizontally outwardly from circular ridge 35, as shown, forming the rim of the bowl assembly. Bowl lip 37 serves as a physical obstacle preventing insects from entering the bowl area by crossing over ridge 35 and into the bowl.

An outer obstacle wall 39 extends downwardly from the outer edge of bowl lip 37 and aesthetically forms the outer wall surface 41 of the bowl assembly. Surface 41 may include an offset portion 43 or other embossed or formed designs, for making the feeding device attractive. The distance "x" that the lower edge of wall 39 is above the upper surface 17a of the stand or above ground must be of a sufficient height to prevent the insect from reaching the wall 39 directly from the pathway 17a or ground 19.

For example, German roaches account for a large majority of home infestations. German roaches approximate three-fourths of an inch in length. Therefore, the height of the outer edge of the bowl assembly should be established at approximately ¾" above the pathway 17a or ground 19, i.e. a height such that the insect cannot pull itself up onto wall 39, if German roaches are to be excluded. Where larger or smaller insects are to be expected in the particular environment, the height of the bottom edge of wall 39 above pathway 17a (or above ground 19), i.e. "x", may be adjusted upwardly or downwardly accordingly.

Outer obstacle wall 39 is a single-thickness member, frustumconical in shape, which is secured along the entire extent of the outer circular edge of bowl lip 37. Obstacle wall 39 includes an inside surface 47 confronting the outer surface 49 of bowl side wall 31. Lip 37 spaces the upper edge of obstacle wall 39 from the upper edge of bowl side wall 31. Obstacle wall 39 is angled outwardly with respect to the bowl wall for providing a more open area between the lower portions of the obstacle wall and the bowl side wall, as shown.

Obstacle wall 39 cooperates with bowl side wall 31 to form a partially enclosed area or barrier 45 which prevents ants or crawling insects from entering bowl area 27. In order to reach the food area of the bowl, the insect must pass into barrier area 45 since the distance "x" is of a sufficient height to prevent the insect from physically reaching up to outer obstacle wall 39.

The spacing between inside surface 47 of obstacle wall 39 and outer surface 49 of side wall 31 must not be too small. As shown in FIG. 4, surface 47A is spaced from surface 49A by a maximum distance z and a minimum distance y. Distance z must be as large or larger than x so that the insect will be required to travel between the two surfaces 47A, 49A as it makes its upward climb along surface 49A.

As the insect reaches point 113 on surface 49A, it is at a point approximately "X" distance from side wall 47A. The insect must travel at least between ground and point 113 before it can reach over to surface 47A of obstacle wall 39A. This distance from ground to point 113 must be sufficient to draw the insect into the barrier area between walls 31A, 39A so that: (1) the insect's -tactic responses will be confused, (2) the insect's olfactory senses are not as strongly stimulated, and (3) the intensity of the ultraviolet light is insufficient for navigation and orientation purposes. For example, with a distance X equal to ⅜ inches, point 113 should be approximately 1½ inches from ground.

In use, the animal feeding device of FIG. 1 is placed on a hard flat surface or ground 19. Base support member 15 elevates bowl area 27 and thus elevates the outer obstacle wall 39 above ground to the height specified as "X" in FIGS. 2, 4 and 5. This elevation of the bowl: (1) creates a mechanical barrier or maze which disturbs or disorients the insect's foraging activity; (2) increases the insect Area Restricted Search (ARS) time making homing orientation more time consuming for a forager that has reached the bowl area 27; (3) disrupts communication among insects during the organization phase of cooperative foraging; (4) creates an open space ("X") that exceeds the combined body and foreleg length of the insects which precludes the insects from "pulling themselves up" onto wall 39; (5) disrupts the trail pheromones of insects that have reached bowl area 27, and have "jumped" from obstacle wall 39 to either ground 19 or pathway 17a; and (6) attenuates the polarized and unpolarized ultraviolet light used for navigation and orientation by insects.

Ants and other insects search for food in several modes: Area Restriction Search, olfaction, trail pheromones, visual cues, and numerous sensorial modalities. Ants initially locate food by some combination of an Area Restricted Search, vision or odor mode in combination with a highly developed internal topographic map developed using multiple sensorial modalities and polarized or unpolarized ultraviolet light from natural or artificial sources. Once the food is discovered, a trail pheromone is deposited by the successful forager as it returns home (nest) and some portion of the colony follows the trail pheromone to the food source. The mechanical barriers of the preferred embodiments disrupt and/or disorient the insect's foraging activities.

The mechanical barrier disrupts or disorients foraging activity in a multiplicity of ways. Insects (ants) have -tactic responses. A taxis is a reflex or orientation movement by insects (ants) in relation to a source of stimulation. Example taxes are Photo (light), Thigmo (contact, especially with a solid object), GEO (gravity), etc. Taxes may be used individually (one at a time), concurrently (more than one at a time), serially (one after another), and most taxes may be either positive or negative. Insects (ants) may switch taxes rapidly and they may switch from positive to negative, or vice versa rapidly. The use of taxes by insects may vary with either or both the environmental states and/or current states of the insect (ant). Given this, obstacle wall 39 shades the outer surface 49 of the bowl wall 31 and the support member 15 from light rays, as represented by light rays 51, 53 (FIG. 5). As shown in FIG. 1, a shadow 55 appears on base support member 15 beneath the obstacle wall 39 of the bowl assembly. The intensity of light within the barrier area 45 is lower than the intensity of light outside the barrier due to the shading of light by wall 39.

If the insect is currently utilizing only its positive phototactic response mode, that is, it prefers to move toward light rather than away from light, as the insect moves along either ground 19 or the pathway 17a of the stand, it moves into the shadow cast by obstacle wall 39. The shadow deters the ant from entering barrier area 45 between the obstacle wall and the bowl side wall. As the insect begins to climb the outer surface or pathway 17 of the support member 15 to enter the barrier area 45, the insect approaches a progressively darker area within barrier area 45. The insect's response tendency is to make a positive phototactic choice and exit barrier area 45 back towards light.

If the ant does not retreat back down outer surface 17, the insect will climb the outer surface 49 of the bowl side wall 31 towards ridge 35. When the insect reaches the upper bowl lip 37, it places itself in a position where all choices of further movement are positively phototactic. If an insect is in either a negative phototactic response mode or alternating between positive and negative phototactic response modes, barrier area 45 would disorient or disrupt foraging activity. If the insect is concurrently or serially utilizing other -tactic response modes, the disorientation/disruption would become more severe. For example, if the food source was initially located through olfactory senses, the insect would utilize, among other, the geotactic response mode to establish an elevation topographic reference point. If the insect was concurrently operating in a negative thigmotactic response mode, it would not climb surface 17 of support member 15 when it was encountered. If it switched to a positive thigmotactic response mode, it would climb surface 17 of support member 15. As it climbed surface 17, the olfactory responses would diminish as it entered barrier area 45. Since it was previously operating either concurrently or serially in a geotactic response mode, it would receive conflicting stimuli. That is, the olfactory modality indicated the presence of a food supply. As the insect climbed surface 17 to approach the area which the olfactory senses identified, the geotactic response mode would provide positive reinforcement, while the olfactory modality would provide negative reinforcement. The result would be disorientation of the insect. The insect would then switch among -tactic responses to provide clarification. For example, it could switch to positive and/or negative phototactic response modes. If it were positive and switched to a negative phototactic response, it would again become disoriented when it reached lip 37 when all choices of movement would be phototactically positive. If it switched to a positive phototactic response mode at that point, both choices would be equally acceptable. Since it had not discovered the food source at the apex of its geotactic response, it would most likely return from its original direction back down surface 49. Barrier area 45 effectively serves to disorient the insects's combined sensoral modalities and -tactic responses.

Insects utilize the polarized ultraviolet portion of the light spectrum to provide navigation and orientation with respect to food, water, and other items of importance. Ultraviolet light sources may be natural or artificial and are used by insects 24 hours a day in any type of weather. Barrier area 45 attenuates the intensity of the ultraviolet spectrum by absorption, reflection, and light scattering. The ultraviolet spectrum loses its ability to provide navigation and orientation cues when it drops below a specified intensity level. Barrier 45 effectively attenuates the ultraviolet light so that insects become disoriented. When the disorientation occurs, the insect attempts to remove itself from barrier 45 in order to regain the ultraviolet navigation and orientation spectrum. The point at which the insect loses its ability to navigate by ultraviolet light is variable depending on: (1) the intensity of the ultraviolet source (e.g. sun's ultraviolet is more intense than moon's ultraviolet source) (2) the color and composition of ground 19 or pathway 17a, (3) the coarseness or smoothness of ground 19 or pathway 17a, and (4) the color, composition, and material of the bowl. Each of these four factors affect the degree of absorption, reflection, and light scattering of ultraviolet light. Therefore, point 113 (FIG. 4) should be located at a point where the ultraviolet light has attenuated to a level sufficient to confuse the insect's navigation.

Referring to FIG. 8, a ray 121 representative of ultraviolet light of a certain intensity radiates as shown by arrows into the barrier area 45. The intensity of ray 121 is represented by its thickness. At points A,B,C, and D, the intensity of the ultraviolet light ray 121 is attenuated due to (1) absorption, (2) light scattering, and (3) reflection. Point D is the point of location of point 113 of FIG. 4.

Stereokenisis is an undirected movement which occurs when an insect encounters an orthogonal surface such as support member 15 of the underside of ridge 35. Specifically, the response mode of the insect when it encounters a circular surface which is orthogonal to its direction of movement is that it chooses to follow the circular surface rather than climb the route of the vertical wall. The stereokinetic effect in conjunction with the disruption of the -tactic response modes and the disruption and attenuation of the ultraviolet light sources used for navigation produces disorientation in the insect.

The preceding illustration may be expanded to the extent of the statistical permutations of the combined sensorial modalities, -tactic responses and stereokinetic movements of the insect and the attenuation of the ultraviolet light attenuation of the insect.

A search mode utilized by insects (ants) is Area Restricted Search (ARS). Several methods of foraging activity exist within ARS; however, the design of the embodiment has the same effect on all forms of ARS. The effect is that it increases search time through the use of surfaces 17,49, lip 37 and surface 47 as opposed to a single exterior wall in a conventional feeding device. The distance traveled in foraging activity is approximately three times further in the described embodiment. The increased ARS time makes homing orientation for the insect (ant) more time consuming which puts it at a comparative time disadvantage with competing foragers.

In addition to the ARS time disadvantages created by the embodiment, a forager that does discover the food source has a second disadvantage. When the food source is discovered, the insect (ant) begins deposition of a trail pheromone which is volatile. Trail pheromones are specific scents insects use as a communication method to indicate the presence of a food source to the colony, which subsequently follows the trail. Because of the increased time required for homing due to surfaces 17 and 49, lip 37 and surface 47, the volatile characteristic of the deposited trail pheromones will produce three effects: a weaker odor (trail pheromone) signifying an unimportant food source; no odor (pheromone) indicating no food source; and/or a trail pheromone that, when compared with the trail pheromones of other foragers which have discovered a food source at approximately the same time, is comparatively uninteresting with respect to locating a food source. Disruption of the communication process described above during the organization phase of cooperative foraging is known to be very dysfunctional to successfully utilizing a food source. The organization phase refers to the recruiting of harvesters by the foragers.

FIGS. 2, 4 and 5 indicate the variable distance "X" above either ground 19 or pathway 17a. This distance prevents crawling insects from "pulling themselves up" onto outer surface 41. The distance must be greater than the combined length of both the forelegs and the body length (from the tip of the mandibles to the tip of the gaster) of the insect (ant).

Insects (ants) may reach bowl area 27 either by having a size exceeding the distance "X" or by successfully traversing surfaces 17 and 49, underside of lip 37, surfaces 47 and 41 and upper side of lip 37. If bowl area 27 is reached, the insect (ant) will begin to deposit a trail pheromone on surface 41 of outer obstacle wall 39 as it leaves the food area. When the insect reaches the offset portion 43 (FIG. 5) or the bottom of obstacle wall 39A (FIG. 4), it will probably elect to "jump" to either ground 19 or pathway 17a. In that event, the trail pheromone will not be continuous. The forager will return to home and a portion of the colony will follow the trail pheromone to the point of discontinuity. The insects' (ants') access to the food source will be precluded because a continuous trail pheromone does not exist.

Since insects may use air-borne scents to discover food, once the insect is within barrier area 45 between the obstacle wall and bowl side wall, scent from the food no longer provides direction. The scent would appear to the insect to be coming from the ground level. The scent travels around obstacle wall 39 and enters the barrier area from ground level. This directs the insect to return to the start pathway 17a or ground 19 to exit barrier area 45 rather than continuing the food search within the barrier area.

To provide a further barrier, if desired, insect poison or repellant may be placed on either or both of the inside surfaces 47,49 of the barrier area. The poison and/or repellant may be of several types: spray, liquid, gel, or adhesive.

Referring to FIG. 6, another embodiment is illustrated in which additional physical obstacles 59, 61 may be secured to the outer surface 41 and inside surface 47, respectively, of obstacle wall 39. The additional obstacles 59,61 are frustumconical in shape and cooperate with obstacle wall 39 in order to provide additional barrier areas 63,65 for providing additional phototaxis and scent barriers operating in a similar fashion as barrier area 45.

Referring to FIG. 7, another embodiment is illustrated in which moats 67,69, and 71 may be constructed along the side wall and obstacle wall as shown. The moats may be filled with any form of liquid, spray, or gel insecticide. An exterior port 73 may be utilized to fill moats 69,71.

The embodiment of FIG. 1 must be used on a hard surface, whereas the stand pathway design of FIG. 5 permits use of the feeding device on uneven surfaces, e.g., grass, dirt, gravel, etc. The stand member of the embodiment of FIG. 5 prevents the animal from pushing the feeding device against any object that would bypass the barrier. An example would be a dog pushing the feeding device against a wall, tree or grass and thereby permitting the insect to climb up the wall (tree, blade of grass, etc.) and circumvent the barrier.

The stand member of FIG. 5 acts as a further barrier with respect to ants or insects which burrow from beneath the feeding device. Such burrowing insects cannot emerge from the ground directly under the barrier area as is possible with embodiment of FIG. 1. The barrier area is more effective in the embodiment of FIG. 5 where the burrowing insect emerges outside of the stand member 16, and not under the barrier area, since the stand member has a larger diameter than the diameter of the bowl assembly. It is believed that this occurs because the insect emerges from the dark area (underground) and proceeds into the dark area of the barrier of embodiment in FIG. 1. However, with the embodiment of FIG. 5, the insect emerges into conditions which cause the insect's various -tactic responses, stereokinetic movements (and ultraviolet light attenuation) to disturb the insect's foraging activity (as previously described).

The method described above interferes with an insect's navigation and orientation systems in such a manner as to prevent it from reaching a food source. This same method of preventing insects from reaching a food source may be used in forms other than to prevent insects from reaching the food source of a pet feeding dish. For example, insects may be excluded from buildings, homes, etc., within which food sources may be found.

The term "insect" has been used in a broad sense to include small pests of the crawling (land moving) variety which seek to enter, for example, a food area or water source. Such pests include gastropods such as snails and slugs.

It is to be understood, of course, that the foregoing describes different embodiments of the present invention and that modifications may be made therein without departing from the spirit or scope of the present invention as set forth in the appended claim.

We claim:

1. An animal feeding bowl for placement on the ground and which prevents a crawling insect of a predetermined size from reaching the food area of the bowl, comprising;

bowl means defining a bowl area capable of holding animal food and/or water, said bowl means having an upper ridge defining the sole entry location for crawling insects into the bowl area;

supporting means for supporting said bowl means with respect to the ground for disposing said upper ridge at an elevation located above ground;

a first surface positioned with respect to said support means for defining a first pathway for a crawling insect to reach food in the bowl area from ground, said first surface disposed in a direction leading away from ground toward the bowl area for discouraging the climbing of the insect onto said first pathway when the insect is using -tactic response modes either individually, concurrently or serially;

obstacle means secured along the entire extent of said ridge and including a surface bearing member depending towards the ground and being spaced from ground by a predetermined distance, said distance being greater than said pre-determined size of the insect so as to prevent the crawling insect from climbing onto said surface bearing member from ground, said surface bearing member carrying a second surface confronting at least a portion of said first surface, said second surface being spaced apart from said first surface by said predetermined distance at least for a portion of its extent upward from ground, said surface bearing member physically blocking insects from passing from said first pathway across said ridge into said bowl area, said second surface defining a second pathway being disposed in a direction leading from said first pathway toward ground to a point having an elevation different than the elevation of said ridge for discouraging continued movement by an insect along said second pathway toward ground when the insect is using -tactic response modes either individually, concurrently or serially, said obstacle means cooperating with said first surface for generating a phototactic barrier along said first pathway by shadowing thereof to discourage continued movement by the insect along said first pathway toward said bowl area when the insect is in a positive phototactic response mode or using ultraviolet light for navigational orientation, said obstacle means being disposed relative to said first surface for generating a geotactic barrier to disorient the insect's foraging for a food source at a particular elevation, said first and second pathways being disposed relative to the direction of food scent from food in the bowl area for discouraging the insect from movement along said first pathway toward said bowl area.

2. An animal feeding bowl according to claim 1 wherein said surface bearing member includes a frustumconical member depending from said ridge toward ground with increasing diameter, at least a portion of its extent having a diameter greater than said predetermined distance.

3. An animal feeding bowl according to claim 1 wherein said bowl means includes a third surface which defines the sides of the bowl area.

4. An animal feeding bowl according to claim 1 wherein said first surface includes a first surface portion which is orthogonal to the ground and a second surface portion which is frustumconical in shape.

5. An animal feeding bowl according to claim 2 wherein said first surface is frustumconical in shape.

6. An animal feeding bowl according to claim 3 wherein said bowl means is formed from said third surface and a circular base.

7. An animal feeding bowl according to claim 1 and further including second obstacle means having a second surface depending toward ground and being spaced from said first named surface for forming a second barrier area for providing multiple -tactic and ultraviolet light barriers.

8. An animal feeding bowl according to claim 1 wherein said supporting means is formed integrally with said circular bowl.

9. An animal feeding bowl according to claim 1 wherein said continuous shape is a circle.

10. An animal feeding bowl according to claim 1 wherein said supporting means includes a leg member means for supporting said bowl means and a non-skid surface means carried by said leg member means for making sliding of said bowl difficult.

11. An animal feeding bowl according to claim 10 wherein said leg member means includes means defining an opening, and wherein said non-skid surface means includes an annular ring force fit into said opening.

12. An animal feeding bowl according to claim 11 wherein said ring is substantially continuous.

13. An animal feeding bowl according to claim 12 wherein said ring is circular.

* * * * *